United States Patent [19]

Netsch et al.

[11] Patent Number: 5,167,004
[45] Date of Patent: Nov. 24, 1992

[54] TEMPORAL DECORRELATION METHOD FOR ROBUST SPEAKER VERIFICATION

[75] Inventors: Lorin P. Netsch, Allen; George R. Doddington, Richardson, both of Tex.

[73] Assignee: Texas Instruments Incorporated, Dallas, Tex.

[21] Appl. No.: 662,086

[22] Filed: Feb. 28, 1991

[51] Int. Cl.⁵ ................................................ G10L 9/16
[52] U.S. Cl. ............................................................ 395/2
[58] Field of Search .................................... 381/41-43

[56] References Cited

U.S. PATENT DOCUMENTS

| | | | |
|---|---|---|---|
| 3,700,815 | 10/1972 | Doddington et al. | 381/42 |
| 4,032,711 | 6/1977 | Sambur | 381/42 |
| 4,363,102 | 12/1982 | Holmgren et al. | 381/42 |
| 4,752,957 | 6/1988 | Maeda | 381/42 |
| 4,827,518 | 5/1989 | Fenstel et al. | 381/42 |
| 4,949,379 | 8/1990 | Cordell | 381/42 |

OTHER PUBLICATIONS

Peacocke et al., "An Introduction to Speech and Speaker Recognition", Computer, published by the IEEE Computer Society, vol. 23, No. 8, Aug. 1990, pp. 26-32.

Naik, J., et al., "Speaker Verification Over Long Distance Telephone Lines", ICASSP '89, May 23-26, 1989, Glasgow, Scotland, pp. 524-527.

Roucos, S., "Stochastic Segment Modeling Using the Estimate-Maximize Algorithm", ICASSP '88, Apr. 11-14, 1988, New York, pp. 127-130.

*Primary Examiner*—Allen R. MacDonald
*Assistant Examiner*—David D. Knepper
*Attorney, Agent, or Firm*—L. Joy Griebenow; William E. Hiller; Richard Donaldson

[57] ABSTRACT

A speaker voice verification system uses temporal decorrelation linear transformation and includes a collector for receiving speech inputs from an unknown speaker claiming a specific identity, a word-level speech features calculator operable to use a temporal decorrelation linear transformation for generating word-level speech feature vectors from such speech inputs, word-level speech feature storage for storing word-level speech feature vectors known to belong to a speaker with the specific identity, a word-level speech feature vectors received from the unknown speaker with those received from the word-level speech feature storage, and speaker verification decision circuitry for determining, based on the similarity score, whether the unknown speaker's identity is the same as that claimed. The word-level vector scorer further includes concatenation circuitry as well as a word-specific orthogonalizing linear transformer. Other systems and methods are also disclosed.

9 Claims, 5 Drawing Sheets

TEMPORAL DECORRELATION METHOD FOR ROBUST SPEAKER VERIFICATION

BACKGROUND OF THE INVENTION

1. Field of the Invention

This invention relates generally to speech processing, and more particularly to a system and method for robust speaker verification employing temporal decorrelation.

2. Description of the Related Art

Current system and methods of speaker voice verification require voice enrollment prior to actual verification usage. During such enrollment, a model of the speech particular to each speaker to be verified is created. This is usually done by gathering speech data from several utterances known to come from a given speaker and then processing the data to form models unique to the speaker. The unique models are stored along with information that identifies the speaker of the models.

During actual verification usage, speakers first claim their identity. The system requests the speaker speak an utterance which is then compared to the stored speech models for the speaker with the claimed identity. If the spoken utterance and speech models agree closely, then the speaker is declared to be the same as the claimed identity.

Present methods of speech processing measure vectors of speech parameters from an utterance over small periods of time, called frames, during which it is assumed that the acoustical signal is not changing appreciably. Often, these parameter vectors undergo an orthogonalizing linear transformation, or some other transformation, to create statistically uncorrelated speech parameter vectors, also known as speech feature vectors. The resulting parameter or feature vectors can be used to model an individual's speech.

Currently, some speaker verification systems group together the speech vectors from all frames of a given person's speech and use them to determine average statistical properties of the speech vectors over entire utterances. Sometimes these systems estimate average statistical properties of the distortion of the speech vectors due to different handsets and channels. The average statistical properties are subsequently used to verify the speaker.

Other speaker verification systems group speech vectors that correspond to the same speech sounds in a process called alignment. Dynamic Time Warping (DTW) or Hidden Markov Modeling (HMM) are among the more well-known methods for alignment. The system estimates the statistical properties of the speech vectors corresponding to each group separately. The resulting collection of statistical properties of the groups of speech vectors form the reference model for the speaker to be verified. Verification systems often separate the collection of statistical properties into multiple models representing individual words, syllables, or phones.

It is important to note that all of these present art systems utilize statistical properties of the speaker's data at the speech vector level. Hence, the systems implicitly assume independence of the statistical properties associated with each group of speech vectors.

One of the problems faced by many speaker verification applications include unavoidable distortion or variation of the speech signal. A distorted speech signal results in distorted speech vectors. If the vectors are considered individually, as current verification systems do, it is difficult to determine whether the speech came from an assumed true speaker or an impostor because of the distortion of the speech vector. This degrades speaker verification performance.

For example, in telecommunications applications, where one wishes to control access to resources by voice identification over the telephone, use of different telephone handsets and channels often distorts and varies a person's speech. In other applications, such as an automated teller for banking, the use of different microphones causes variation of the speech signal. It is also important to note that with current speaker verification systems, since only one telephone handset or microphone is used at a time, the variation of the speech signal is consistent so long as only that particular handset or microphone is used.

Accordingly, improvements which overcome any or all of these problems are presently desirable.

SUMMARY OF THE INVENTION

In view of the above problems associated with the related art, it is an object of the present invention to provide a system and method for robust speaker verification which compensates for distortion or variation of the speech signal due to use of different telephone handsets, telephone channels, or microphones.

It is another object of the present invention to provide a system and method for improving the performance of speaker verification.

It is a further object of the present invention to provide a system and method which reduces the amount of storage necessary for speaker specific speech information.

These and other objects are accomplished according to preferred embodiments of the present invention by providing a temporal decorrelation system and method for speaker voice verification that utilize the statistically optimal correlation between measured features of speech across whole words to verify the speaker's identity. The present invention exploits correlations between groups of speech vectors representing the sounds of individual words in an utterance. Since these correlations span whole words, it is possible to find statistical features that span entire words which are relatively independent of distortions that remain constant during an entire utterance. Decorrelation processing using these statistical features, as embodied in the present invention, provides a verification system less sensitive to distortion and variations which are consistent during an utterance, resulting in improved speaker verification performance.

Such a system and method for automated temporal decorrelation of speaker voice verification includes a collector for receiving speech inputs from an unknown speaker claiming a specific identity, a word-level speech feature calculator for generating word-level speech feature vectors from such speech inputs, word-level speech feature storage for storing word-level speech feature vectors known to belong to a speaker with the specific identity, a word-level vector scorer to calculate a similarity score between the word-level speech feature vectors received from the unknown speaker with those received from the word-level speech feature storage, and speaker verification decision circuitry for determining, based on the similarity score, whether the unknown speaker's identity is the same as that claimed.

The word-level vector scorer further includes concatenation circuitry as well as a word-specific orthogonalizing linear transformer.

The temporal decorrelation system and method of the present invention also reduces the number of parameters that must be stored to represent a specific speaker's voice, thereby reducing the amount of storage necessary for speaker specific speech information. Such system and method includes establishing word-level speech feature vectors from a spoken utterance, scoring the word-level speech feature vectors, discarding preselected whole-word speech feature vectors, and storing the remaining whole-word speech feature vectors. The step of scoring further includes performing a word-specific orthogonalizing linear transformation to create whole-word feature vectors which are statistically uncorrelated over entire words within the spoken utterance.

These and other features and advantages of the invention will be apparent to those skilled in the art from the following detailed description of a preferred embodiment, taken together with the accompanying drawings, in which:

DESCRIPTION OF THE DRAWINGS

Corresponding numerals and symbols in the different figures refer to corresponding parts unless otherwise indicated.

DETAILED DESCRIPTION OF PREFERRED EMBODIMENTS

Figure 1:
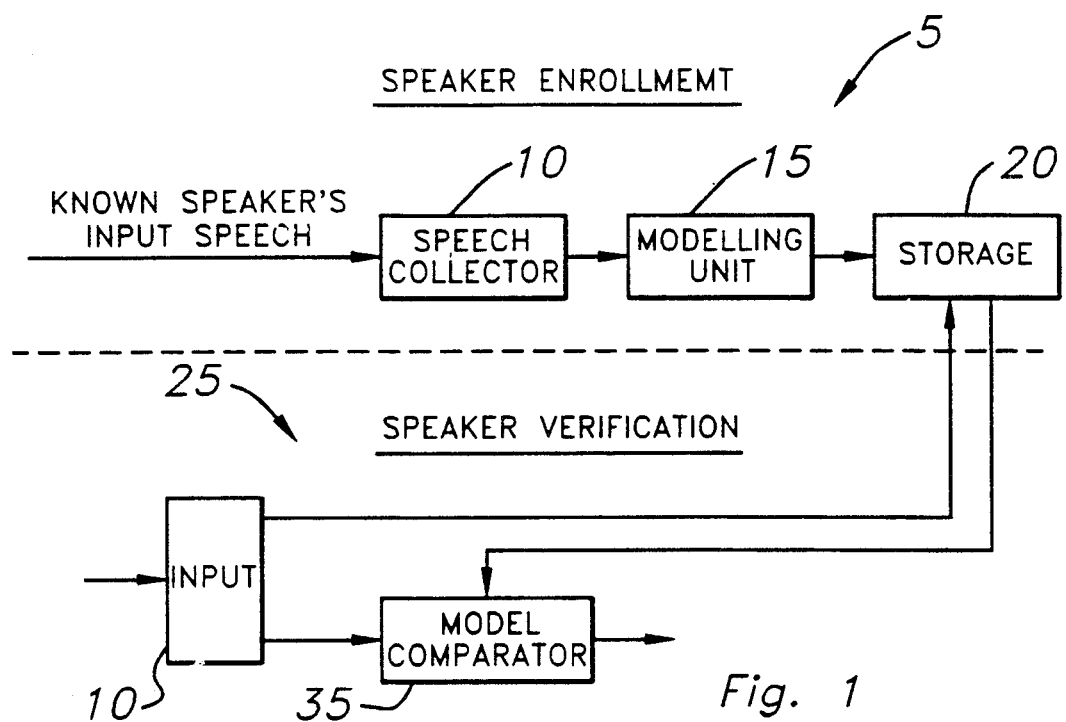
FIG. 1 is a block diagram of an example of a general speaker verification system.

A preferred embodiment of the present invention is best understood by first considering FIG. 1, illustrating a general speaker verification system. As indicated above, speaker voice verification requires voice enrollment prior to actual verification usage. To enroll a known speaker, enrollment system 5 enables a known speaker to provide utterances to speech collector 10 by microphone, telephone handset, channel, or the like. Speech collector 10 collects speech parameter vectors from such utterances and provides them to modeling unit 15. Modeling unit 15 forms models unique to the known speaker based on these speech parameter vectors. These speaker-unique models are stored, along with information that identifies the speaker of the models, in storage 20.

In some instances, several repetitions of the same word or phrase are collected and parameter vectors corresponding to the same portions of speech are subjected to alignment (grouping of vectors). The resulting groups of vectors are then averaged by modeling unit 15 to provide a good estimate or model of the speaker's specific reference speech parameter vectors. The resulting set of parameter vectors form the reference model for the speaker to be verified. Often the parameter vectors are divided to form several separate models representing portions of speech such as individual words, syllables, or phones.

During actual speaker verification, a speaker first inputs his claimed identity to input portion 30 of verification system 25. This can be accomplished by various means such as keying in an identifying under (digit entry) via a telephone keypad, using a credit card with recorded information, voice recognition of an identification phrase, or any other suitable means. Verification system 25 uses this claimed identity to retrieve the corresponding speech models from storage 20. Once verification system 25 retrieves the speech models for the claimed identity, verification system 25 may request that the speaker speak an utterance, or use the utterance provided to claim an identity.

Figure 2:
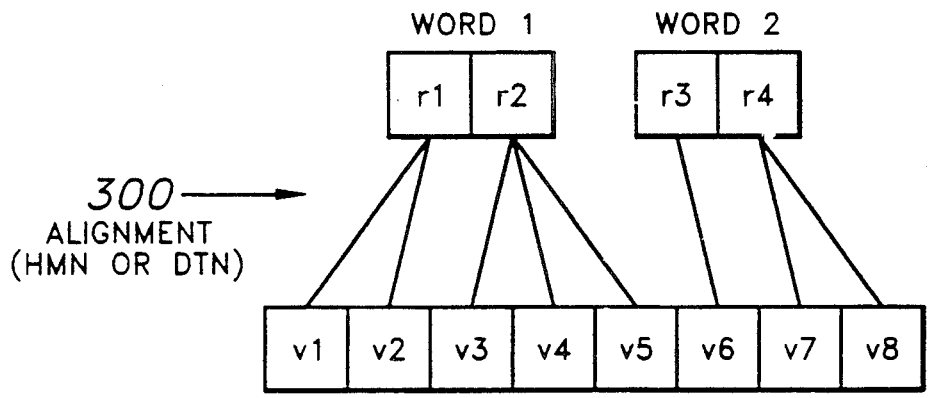
FIG. 2 is a block diagram of showing alignment processing without the present invention.

In fixed text verification systems, verification system 25 has knowledge of the text of each speaker's verification utterance. After the utterance is collected from the speaker, it is converted to a sequence of input speech vectors in a manner similar to enrollment. These input speech vectors are then aligned with the reference model vectors corresponding to the speaker with the claimed identity using DTW, HMM, or other algorithms resulting in a correspondence between each input speech vector and a reference model (parameter) vector. An example of this type of alignment is shown in FIG. 2, where input speech vectors v1-v8 are aligned with the reference model (parameter) vectors r1-r4. Reference parameter vectors r1 and r2 correspond to a first word, while r3 and r4 correspond to a second word.

Figure 3:
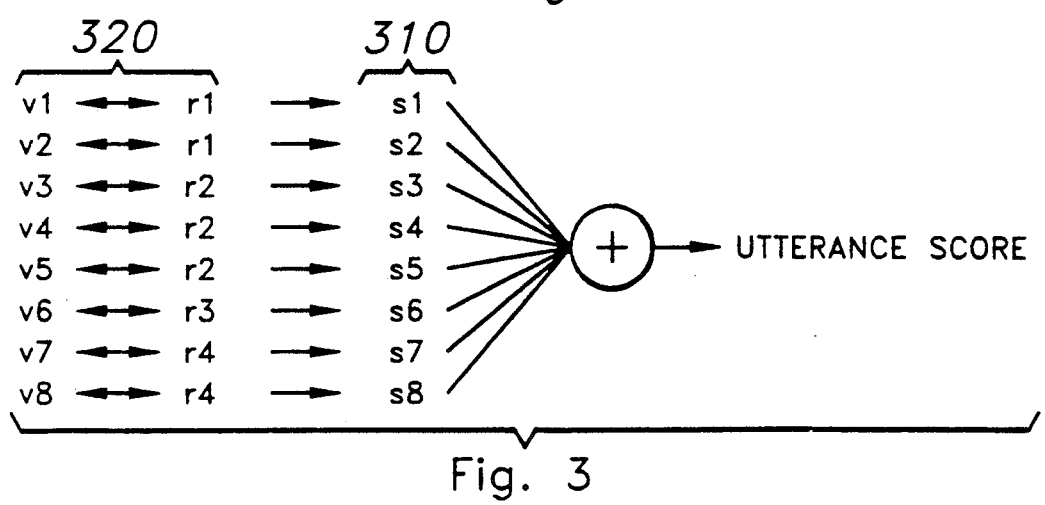
FIG. 3 is a block diagram depicting utterance scoring without the present invention.

After alignment, verification system 25 compares the input speech signal of the spoken utterance to the retrieved speech models in speech model comparator 35. The comparison is made between each of the input speech vectors and its mapped reference vector to determine the amount of similarity between the vectors. Comparator 35 establishes a similarity score 310, as illustrated in FIG. 3, calculated for the entire verification utterance, based on the closeness of the input speech signal to the models retrieved from storage 20. This closeness is the sum of similarity measurements 320 between the input speech vectors and the mapped reference vectors. Similarity of vectors may be determined by several methods including statistical maximum likelihood calculations or vector quantization. If the utterance score indicates that the reference and input vectors are similar enough over the entire utterance to meet criteria for success, (i.e., the spoken utterance and speech models agree closely), then verification system 25 decides the speaker is indeed the same as the claimed identity. In some systems, if the claimed identity is verified, then the input speech vectors are averaged with the mapped reference vectors to produce an updated set of speech reference models which replace the models kept in storage 20.

In a preferred embodiment of the present invention, enrollment and verification both use HMM alignment of the input speech parameter vectors with the reference model parameter vectors. However, the vectors making up each word are subsequently concatenated to form single vectors representing whole words in the utterance. The whole-word vectors are subjected to word-specific orthogonalizing linear transformations (using a temporal description linear transformation TDT) to create whole-word vectors which are statistically uncorrelated over entire words. The resulting whole-word vectors are used to determine the measure of similarity between the input speech utterance and the stored speech parameters.

Figure 4A:
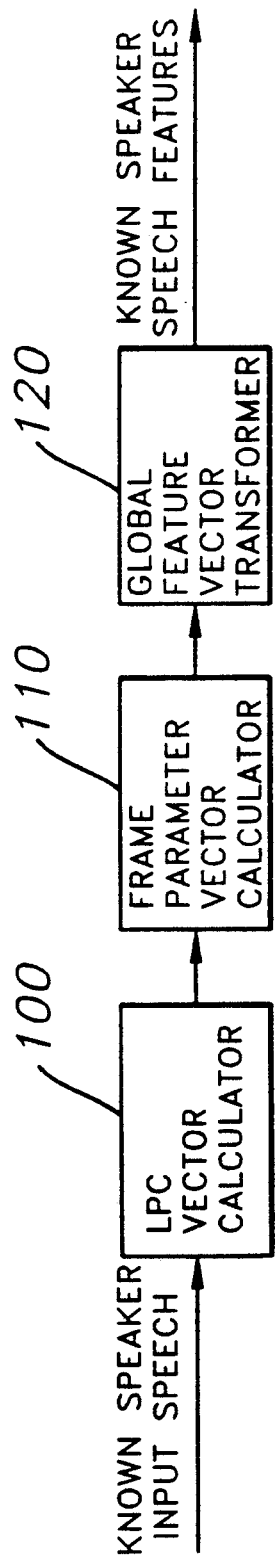
FIGS. 4a-b are block diagrams of steps performed by an enrollment processor according to a preferred embodiment of the present invention.

More specifically, FIG. 4a shows a block diagram of a preferred embodiment which determines the known speaker speech feature vectors from the speaker's input speech during enrollment.

Beginning with Block 100, the speaker to be enrolled says a known verification utterance. This speech signal undergoes a Linear Prediction Coefficient (LPC) calculation to produce vectors of linear prediction coefficients. In the preferred embodiment, these vectors consist of ten coefficients plus two elements to define energy and pitch. Frame parameter vector calculator 110 uses the LPC vectors in a non-linear process to determine energy, spectral, difference energy, and difference spectral speech parameters. These global speech parameters are transformed by global feature vector transformer 120 into speech feature vectors for the known speaker. The global feature vector transform is a predetermined linear transformation which is calculated prior to enrollment. It is constructed by determining vector statistics from a database representing a large number of speakers. The vector statistics are used in an eigenvector analysis to design the linear transformation which determines uncorrelated features which optimally discriminate between speakers.

The speech feature vector formation described above is just one way of creating speech features. There are other feature calculation methods, such as calculation of cepstral coefficients, or use of feature vectors directly derived from the LPC coefficients such as parcor or log area ratio coefficients. The present invention should not be limited in any manner to a particular speech vector calculation method.

Figure 4B:
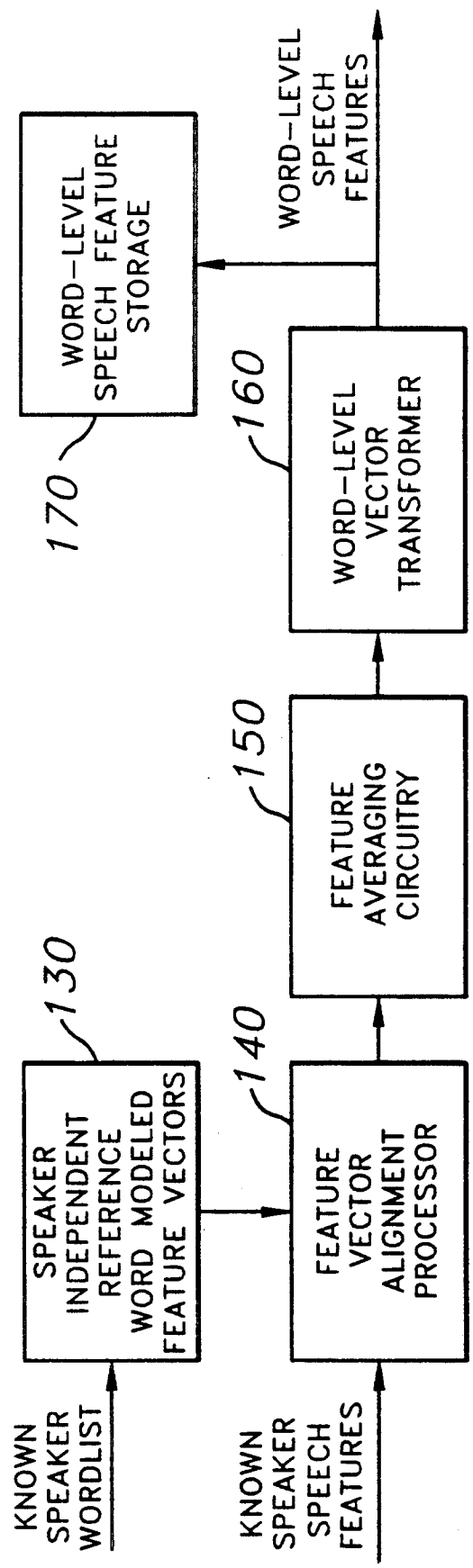

FIG. 4b illustrates a block diagram of the preferred embodiment of enrolling the known speaker by creating word-level speech models specific to the speaker from the speech feature vectors. Feature vector alignment processor 140 receives the speech feature vectors from global feature vector transformer 120, and aligns these features with previously determined speaker independent reference word model feature vectors 130 representing acoustical observations for each word of the verification utterance. Reference word model feature vectors 130 are statistical representations of each word in the known speaker's enrollment input speech, and are created from a previously collected speech database using a large number of speakers. According to a preferred embodiment, alignment processor 140 employs a Viterbi search HMM algorithm to align the speech and reference models, thereby producing a mapping between input speech feature vectors and reference speech feature vectors 130. As stated before, other well-known algorithms, such as Dynamic Time Warping (DTW), may also be used to perform the alignment. In the preferred embodiment, the mapping is such that there is at least one input speech feature vector mapping to each reference vector 130, and each input speech vector maps to only one reference vector 130.

In the preferred embodiment, feature averaging circuitry 150 averages the input speech feature vectors that map to the same reference vector 130 to produce averaged reference model vectors which characterize the speech of the enrolled speaker for each word. This creates a set of vectors from the known speaker corresponding to the speaker independent reference word model vectors. Note that this results in the same number of averaged input speech vectors as there are reference vectors. Other means of combining the input speech feature vectors rather than averaging may be performed, including selection of each individual input vector which best matches each reference vector.

This averaging process may be repeated using several enrollment utterances so that the averaged reference model vectors for each word characterize better the speech of the enrolled speaker. The averaged reference model vectors corresponding to each word are usually stored in the system for subsequent verification processing. If a further reduction in memory storage is desired, storage of the averaged reference model vectors is not required.

Word-level vector transformer 160 first concatenates all of the averaged input speech vectors received from feature averaging circuitry 150 corresponding to each word to produce a single word-level averaged input speech vector for each word. Word-level vector transformer 160 transforms the word-level vectors using a word-level linear transformation, also known as a temporal decorrelation linear transformation (TDT). The word-level linear transformation is calculated prior to an enrollment using word-level vector statistics from a database representing a large number of speakers, and is designed to produce uncorrelated word-level speech features which optimally discriminate between speakers. As the last step during enrollment, word-level speech feature storage 170 stores data identifying the known speaker and all of the word-level speech feature vectors for the known speaker received from word-level vector transformer 160.

Figure 5:
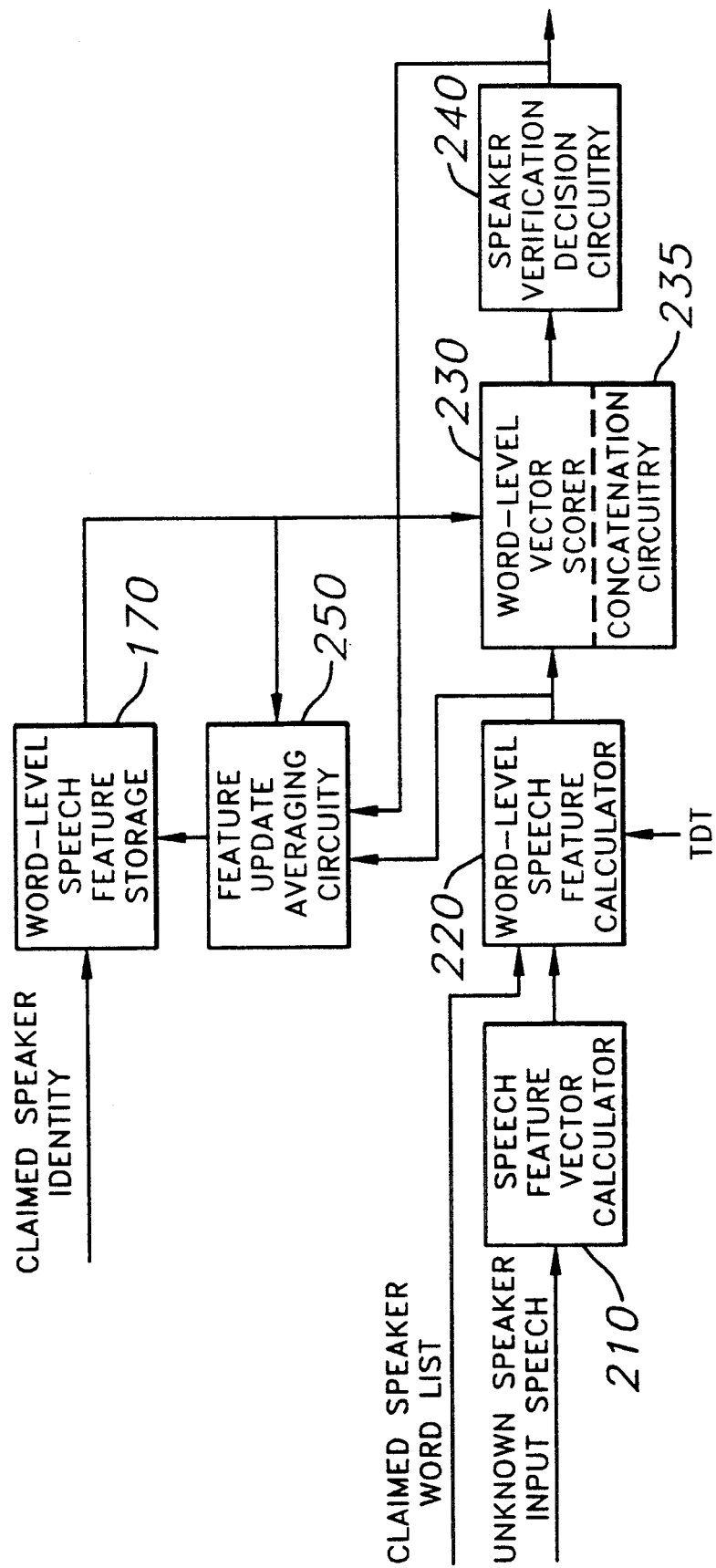
FIG. 5 is a block diagram of a speaker verification processor according to a preferred embodiment of the present invention.

FIG. 5 is a block diagram of the preferred embodiment of a speaker verification processor according to the present invention. During verification processing, an unknown speaker claims that his identity is that of a speaker that has already been enrolled on the system. The task of the verification system is to determine whether this is true. To accomplish this, the verification system prompts the speaker to say his verification utterance. The verification utterance is collected and the verification processor calculates speech feature vectors in speech feature vector calculator 210. Such calculations involve the same processing discussed above in connection with FIG. 4a. Word-level speech feature calculator 220 uses the speech features output from speech feature vector calculator 210 together with the claimed speaker word list to form word-level speech feature vectors for the unknown speaker.

Figure 6:
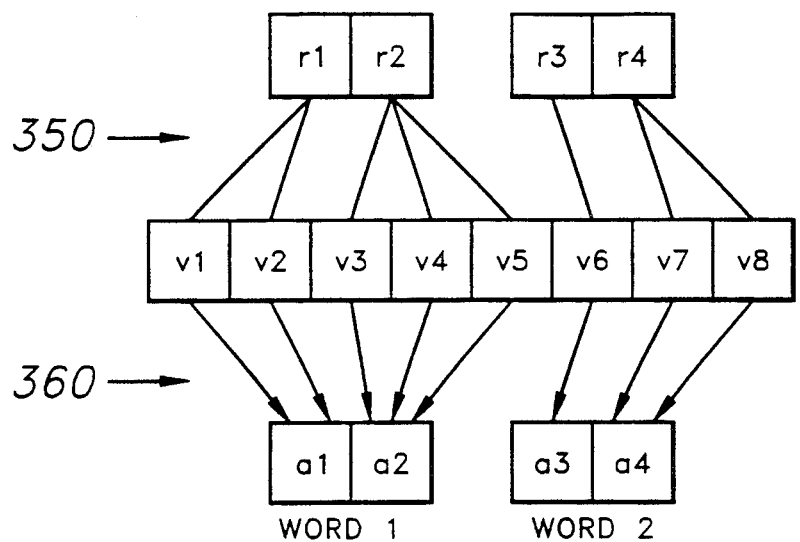
FIG. 6 is a block diagram of alignment processing according to a preferred embodiment of the present invention.

The processing performed by word-level speech feature calculator 220 is the same as that described in connection with FIG. 4b, except that the word-level speech feature vectors are not directly stored in a word-level speech feature storage. Instead, the word-level speech feature vectors from the unknown speaker are input to word-level vector scorer 230. Thus, word-level speech feature calculator 220 uses HMM alignment to map the input speech vectors to the speaker specific reference model vectors which correspond to each word for the speaker with the claimed identity. An example is shown in FIG. 6, where input speech vectors v1 through v8 are mapped (step 350) to reference vectors r1 and r2 for word 1 and reference vectors r3 and r4 for word 2.

Word-level vector scorer 230 calculates a similarity score between the word-level speech feature vectors of the unknown speaker coming from word-level speech feature vector calculator 220 with those which were previously stored in word-level speech feature storage 170. In the preferred embodiment, the similarity score is the sum, over all words, of the Euclidean distances between the word-level speech feature vectors of the unknown speaker and those which were stored for the claimed identity. There are many other similarity score measurements which may be used, such as Mahalanobis distance.

The similarity measurement of the present invention is significantly different from prior art. Rather than making a similarity comparison between each input speech vector and the mapped reference model vector, the input speech vectors mapped to each reference model vector are averaged (FIG. 6, step 360) to produce an averaged input speech vector corresponding to each reference model vector (a1-a4). The averaged input speech vectors making up each word are concatenated to form a single whole-word input speech vector for each word. In the example of FIG. 6, a1 and a2 are concatenated to form the whole-word vector for word 1, and a3 and a4 are concatenated by the concatenation circuitry 235 of word-level vector scorer 230, to form the whole-word vector for word 2.

Figure 7:
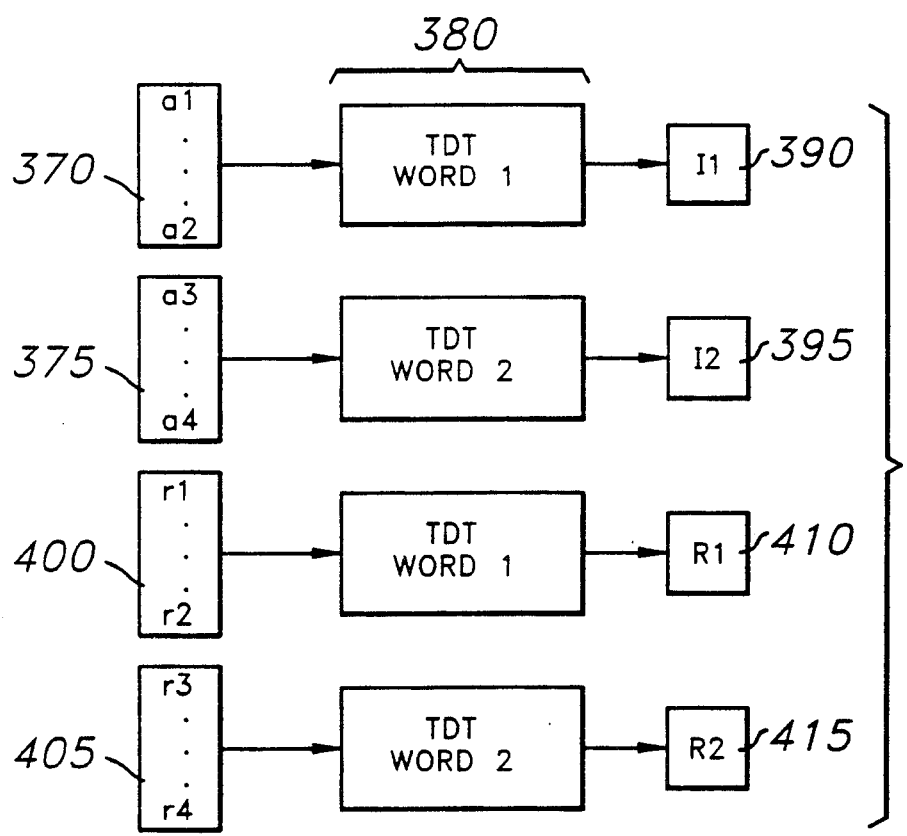
FIG. 7 is a block diagram showing whole-word transformation according to a preferred embodiment of the present invention.

The process of forming whole-word input speech vectors 390,395 and whole-word reference feature vectors 410,415 is illustrated in FIG. 7. Each whole-word input speech vector 370,375 is transformed by a predetermined linear transformation termed the temporal decorrelation transform (TDT) 380 specifically determined for each word to produce a decorrelated whole-word input speech feature vector 390,395, respectively. In a similar manner, whole-word reference speech vectors 400,405 for each word (r1-r4 in FIG. 6) are concatenated to produce a single whole-word reference vector for each word. Whole-word reference speech vectors 400,405 are transformed by the same TDTs 380 to form whole-word reference feature vectors 410,415, respectively.

Figure 8:
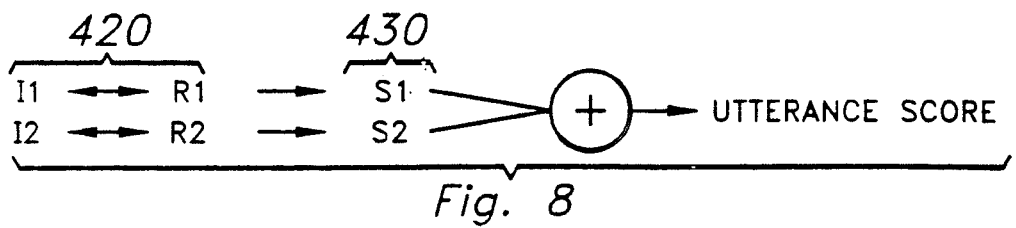
FIG. 8 is a block diagram depicting utterance scoring according to a preferred embodiment of the present invention.

As shown in FIG. 8, whole-word input speech feature vectors 390,395 and whole-word reference feature vectors 410,415 are then compared (step 420) to determine individual whole-word feature vector similarity scores 430. An utterance score is the sum of similarity score 430. Use of a statistical maximum likelihood calculation to indicate similarity is preferred, although other well-known methods such as vector quantization could be used. Due to the decorrelation provided by TDTs 380, many of the features in the whole-word feature vectors 410,415 may be discarded. In the preferred embodiment of the present invention, only about 20% of the whole-word features per vector were utilized.

Returning to FIG. 5, the resulting similarity score from word-level vector scorer 230 is input to speaker verification decision circuitry 240 which compares the score with a predetermined threshold. If the score is below the threshold, then the system decides that the unknown speaker is who he claimed. On the other hand, if the score is above the threshold, then the system allows the unknown speaker up to two more attempts before it decides that the unknown speaker's identity is not the same as the claimed identity.

In the preferred embodiment, if speaker verification decision circuitry 240 determines that the unknown speaker's identity is the same as the claimed identity, then feature update averaging circuitry 250 performs a weighted average of the word-level speech features of the input speech from word-level speech feature calculator 220 with those from word-level speech feature storage 170. The resulting averaged word-level speech features replace those kept in word-level speech feature storage 170 for the claimed speaker identity. This yields an improved model of word-level speech features for the claimed speaker.

Figure 9:
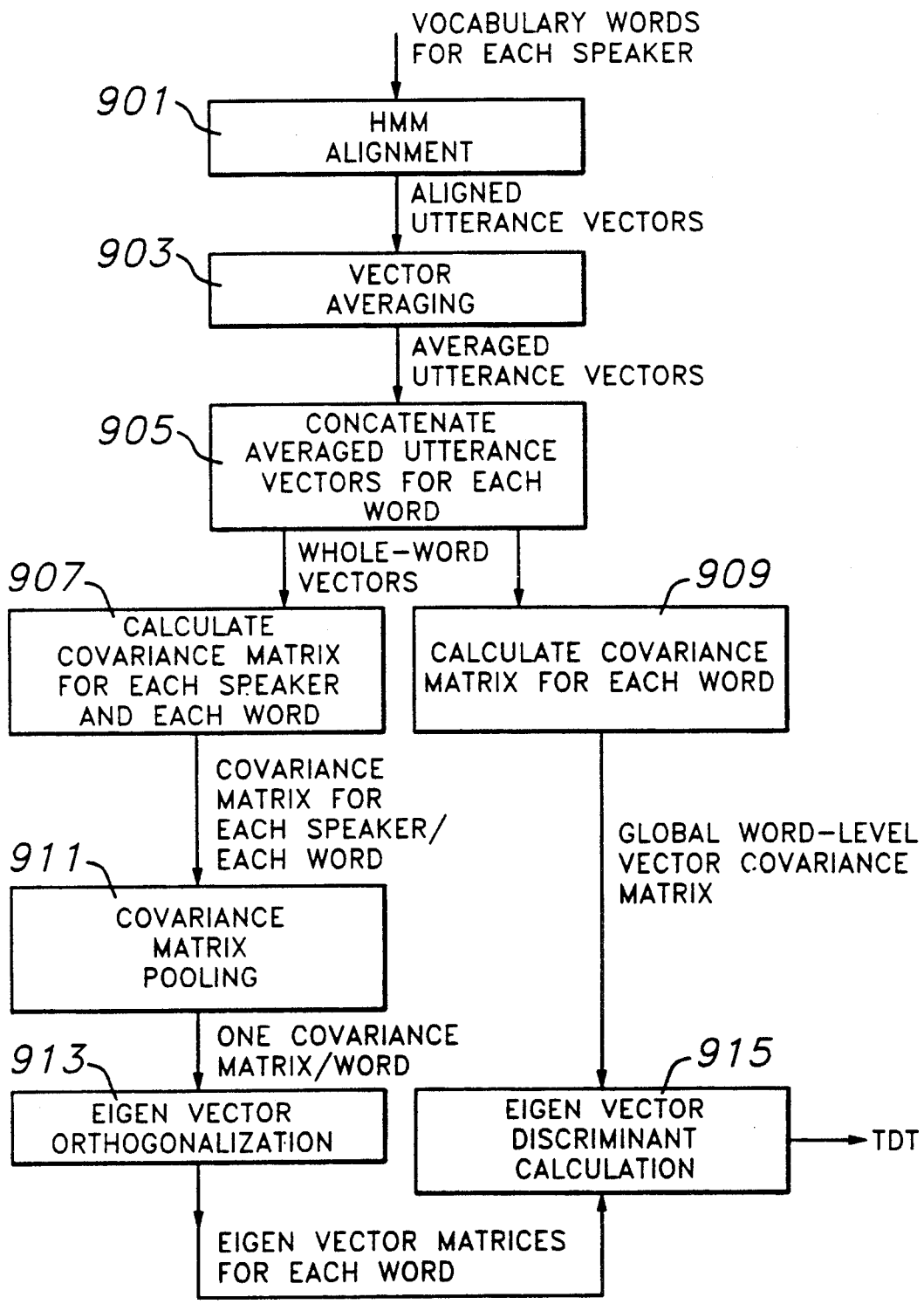
FIG. 9 is a flow chart showing the calculation of temporal decorrelation linear transformations (TDTs) according to the present invention.

The preferred embodiment of the present invention creates a word specific temporal decorrelation linear transformation (TDT) for each word of the vocabulary that a speaker will say, as shown in the flow chart of FIG. 9. Since there are a large number of parameters that must be determined for each TDT, it is useful to employ a speech database consisting of utterances from many different speakers in which the vocabulary words are repeated several times by each speaker.

In order to create a TDT, covariance matrices of whole-word vectors for each vocabulary word are calculated for each speaker in the database, Steps 901-907. These whole-word vectors are formed by a process similar to that for verification as shown in FIG. 2. Using HMM alignment, utterance parameter vectors from each speaker are aligned with predetermined reference model vectors representing each word in the vocabulary, Step 901. After alignment, the utterance vectors mapped to each reference vector are averaged to form averaged utterance vectors, one for each reference vector, Step 903. The averaged utterance vectors for each word are concatenated to form whole-word vectors, Step 905. The whole-word vectors corresponding to each vocabulary word are used to calculate covariance matrices for each speaker and each word, Step 907. The covariance matrices corresponding to the same word for all speakers are then pooled, Step 911. This results in one covariance matrix for each vocabulary word. Each of the covariance matrices is used in an eigenvector orthogonalization calculation, Step 913 to generate eigenvector matrices for each word. Additionally, all whole-word vectors for each word (regardless of speaker) are used to determine a covariance matrix for each word that represents global word-level vector covariance, Step 909. The two covariance matrices thus formed for each vocabulary word are used in an eigenvector discriminant calculation to determine the linear transformation that defines uncorrelated word-level features which optimally discriminate between speakers, Step 915. The eigenvector matrices output from Step 915 representing represent the decorrelated whole-word transformations and are known as TDTs.

As mentioned above, the amount of storage for speaker specific data is reduced by use of the present invention. This occurs because only the whole-word reference features required to perform the similarity calculations are stored. Since only about 20% of the features are used for the similarity calculation, storage can be reduced by about 80% as compared to storing all of the reference vectors.

The present invention employs temporal decorrelation involving scoring of word-level vectors to determine the similarity with stored speaker-dependent reference models. A simple extension of the concept to speech recognition technology can be made by performing alignment as described above, and then determining a word-level score based on similarity with speaker-independent models. This score could be used to guide recognition at the word-level.

While a specific embodiment of the invention has been shown and described, various modifications and alternate embodiments will occur to those skilled in the art. Accordingly, it is intended that the invention be limited only in terms of the appended claims.

We claim:

1. An automated temporal decorrelation system for speaker voice verification, comprising:
   a collector for receiving speech inputs from an unknown speaker claiming a specific identity into a plurality of input vectors for each word spoken;
   a word-level speech feature calculator operable to utilize a temporal decorrelation transformation for generating word-level speech feature vectors from said speech inputs received from said collector thereby creating whole-word vectors which are statistically uncorrelated over entire words with said speech inputs;
   word-level speech feature storage for storing word-level speech feature vectors known to belong to a speaker with said specific identity;
   a word-level vector scorer to calculate a similarity score between said word-level speech feature vectors received from said word-level speech feature calculator with those received from said word-level speech feature storage; and
   speaker verification decision circuitry for determining, based on said similarity score received from said word-level vector scorer, whether said unknown speaker is said speaker with said specific identity.

2. The system of claim 1, wherein said word-level speech feature calculator employs HMM alignment to map said input speech vectors to speaker independent reference model vectors which correspond to each word associated with the speaker with the claimed identity.

3. The system of claim 1, wherein said word-level vector scorer further comprises concatenation circuitry for concatenating said plurality of input vectors making up a single word to form single vectors representing whole words in said speech inputs.

4. The system of claim 1, wherein said similarity score is a sum, over all words, of Euclidean distances between said word-level speech feature vectors from said word-level speech feature calculator and those which were stored in said word-level speech feature storage.

5. A temporal decorrelation method for speaker voice verification, comprising the steps of:
   collecting into a plurality of input vectors a verification utterance from an unknown speaker claiming a specific identity;
   transforming said plurality of input vectors using a temporal decorrelation transformation to establish a word-level speech feature vectors thereby creating whole-word vectors which are statistically uncorrelated over entire words with said utterance;
   retrieving previously stored word-level speech feature vectors known to belong to a speaker with said specific identity;
   scoring said word-level speech feature vectors generated during said step of establishing with said previously stored word-level speech feature vectors; and
   determining whether said unknown speaker is said speaker with said specific identity.

6. The method of claim 5, wherein said step of establishing word-level speech feature vectors further comprises the step of employing HMM alignment to map said input speech vectors to speaker independent reference model vectors which correspond to each word associated with said speaker with the claimed identity.

7. The method of claim 5, wherein said step of scoring further comprises the step of concatenating said plurality of input vectors making up a single word to form single vectors representing whole words in said utterance.

8. The method of claim 5, wherein said similarity score is a sum, over all words, of Euclidean distances between said word-level speech feature vectors from said word-level speech feature calculator and those which were stored in said word-level speech feature storage.

9. A temporal decorrelation method for reducing the amount of storage necessary for speaker specific speech information, comprising the steps of:
   establishing word-level speech feature vectors having a dimension from a spoken utterance;
   reducing the dimension of said word-level speech feature vectors by applying a temporal decorrelation linear transformation to said word-level feature vectors; and
   storing said word-level feature vectors.

* * * * *